(12) United States Patent
Abedini et al.

(10) Patent No.: US 11,671,942 B2
(45) Date of Patent: Jun. 6, 2023

(54) COMMUNICATION CONFIGURATION FOR MULTI-HOP NETWORKS USING REPEATERS

(71) Applicant: QUALCOMM Incorporated, San Diego, CA (US)

(72) Inventors: Navid Abedini, Basking Ridge, NJ (US); Jianghong Luo, Skillman, NJ (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/301,439

(22) Filed: Apr. 2, 2021

(65) Prior Publication Data

US 2022/0322294 A1    Oct. 6, 2022

(51) Int. Cl.
*H04W 72/02* (2009.01)
*H04W 72/04* (2023.01)
*H04L 27/26* (2006.01)
*H04W 72/044* (2023.01)
*H04W 84/18* (2009.01)

(52) U.S. Cl.
CPC ......... *H04W 72/02* (2013.01); *H04L 27/2607* (2013.01); *H04L 27/26025* (2021.01); *H04W 72/046* (2013.01); *H04W 72/0473* (2013.01); *H04W 84/18* (2013.01)

(58) Field of Classification Search
CPC .............. H04W 72/02; H04W 72/046; H04W 72/0473; H04W 72/04; H04W 84/18; H04L 27/26025; H04L 27/2607
USPC .................................................. 370/329–330
See application file for complete search history.

(56) References Cited

U.S. PATENT DOCUMENTS

| | | | |
|---|---|---|---|
| 9,794,873 B2 * | 10/2017 | Lindoff | H04W 56/00 |
| 2017/0208638 A1 * | 7/2017 | Baghel | H04B 17/318 |
| 2019/0150057 A1 * | 5/2019 | Wang | H04W 24/02 |
| | | | 370/311 |
| 2019/0239118 A1 * | 8/2019 | Baghel | H04L 5/0053 |

FOREIGN PATENT DOCUMENTS

EP    3986086 A1 *   4/2022

* cited by examiner

*Primary Examiner* — Candal Elpenord
(74) *Attorney, Agent, or Firm* — Qualcomm Incorporated

(57) ABSTRACT

Various aspects of the present disclosure generally relate to wireless communication. In some aspects, a wireless node may select a communication configuration for use with a repeater wireless node that is using a power detection procedure; and transmit a signal, to the repeater wireless node and to be forwarded by the repeater wireless node to a target wireless node, in accordance with the communication configuration selected for use with the repeater wireless node that is using the power detection procedure. Numerous other aspects are described.

30 Claims, 8 Drawing Sheets

COMMUNICATION CONFIGURATION FOR MULTI-HOP NETWORKS USING REPEATERS

FIELD OF THE DISCLOSURE

Aspects of the present disclosure generally relate to wireless communication and to techniques and apparatuses for communication configuration for multi-hop networks using repeaters.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a source wireless node for wireless communication includes a memory; and one or more processors, coupled to the memory, configured to: select a communication configuration for use with a repeater wireless node that is using a power detection procedure; and transmit a signal, to the repeater wireless node and to be forwarded by the repeater wireless node to a target wireless node, in accordance with the communication configuration selected for use with the repeater wireless node that is using the power detection procedure.

In some aspects, a repeater wireless node for wireless communication includes a memory; and one or more processors, coupled to the memory, configured to: receive a signal, from a source wireless node, in accordance with a source wireless node communication configuration selected for use with a power detection procedure of the repeater wireless node; perform the power detection procedure on the signal based at least in part on receiving the signal; configure a repeater wireless node communication configuration based at least in part on performing the power detection procedure; and forward the signal to a target wireless node based at least in part on configuring the repeater wireless node communication configuration.

In some aspects, a control node for wireless communication includes a memory; and one or more processors, coupled to the memory, configured to: determine that a transmission of a signal from a source wireless node to a target wireless node is to be forwarded by a repeater wireless node that is using a power detection procedure; select a communication configuration for use with the repeater wireless node that is using the power detection procedure; and transmit an indication of the communication configuration for use with the repeater wireless node that is using the power detection procedure.

In some aspects, a non-transitory computer-readable medium storing a set of instructions for wireless communication includes one or more instructions that, when executed by one or more processors of a source wireless node, cause the source wireless node to: select a communication configuration for use with a repeater wireless node that is using a power detection procedure; and transmit a signal, to the repeater wireless node and to be forwarded by the repeater wireless node to a target wireless node, in accordance with the communication configuration selected for use with the repeater wireless node that is using the power detection procedure.

In some aspects, a non-transitory computer-readable medium storing a set of instructions for wireless communication includes one or more instructions that, when executed by one or more processors of a repeater wireless node, cause the repeater wireless node to: receive a signal, from a source wireless node, in accordance with a source wireless node communication configuration selected for use with a power detection procedure of the repeater wireless node; perform the power detection procedure on the signal based at least in part on receiving the signal; configure a repeater wireless node communication configuration based at least in part on performing the power detection procedure; and forward the signal to a target wireless node based at least in part on configuring the repeater wireless node communication configuration.

In some aspects, a non-transitory computer-readable medium storing a set of instructions for wireless communication includes one or more instructions that, when executed by one or more processors of a control node, cause the control node to: determine that a transmission of a signal from a source wireless node to a target wireless node is to be forwarded by a repeater wireless node that is using a power detection procedure; select a communication configuration for use with the repeater wireless node that is using the power detection procedure; and transmit an indication of the communication configuration for use with the repeater wireless node that is using the power detection procedure.

In some aspects, an apparatus for wireless communication includes means for selecting a communication configuration for use with a repeater wireless node that is using a power detection procedure; and means for transmitting a signal, to the repeater wireless node and to be forwarded by the repeater wireless node to a target wireless node, in accordance with the communication configuration selected for use with the repeater wireless node that is using the power detection procedure.

In some aspects, an apparatus for wireless communication includes means for receiving a signal, from a source wireless node, in accordance with a source wireless node communication configuration selected for use with a power detection procedure of the repeater wireless node; means for performing the power detection procedure on the signal based at least in part on receiving the signal; means for configuring a repeater wireless node communication configuration based at least in part on performing the power detection procedure; and means for forwarding the signal to a target wireless node based at least in part on configuring the repeater wireless node communication configuration.

In some aspects, an apparatus for wireless communication includes means for determining that a transmission of a signal from a source wireless node to a target wireless node is to be forwarded by a repeater wireless node that is using a power detection procedure; means for selecting a communication configuration for use with the repeater wireless node that is using the power detection procedure; and means for transmitting an indication of the communication configuration for use with the repeater wireless node that is using the power detection procedure.

In some aspects, a method of wireless communication performed by a source wireless node includes selecting a communication configuration for use with a repeater wireless node that is using a power detection procedure; and transmitting a signal, to the repeater wireless node and to be forwarded by the repeater wireless node to a target wireless node, in accordance with the communication configuration selected for use with the repeater wireless node that is using the power detection procedure.

In some aspects, a method of wireless communication performed by a repeater wireless node includes receiving a signal, from a source wireless node, in accordance with a source wireless node communication configuration selected for use with a power detection procedure of the repeater wireless node; performing the power detection procedure on the signal based at least in part on receiving the signal; configuring a repeater wireless node communication configuration based at least in part on performing the power detection procedure; and forwarding the signal to a target wireless node based at least in part on configuring the repeater wireless node communication configuration.

In some aspects, a method of wireless communication performed by a control node includes determining that a transmission of a signal from a source wireless node to a target wireless node is to be forwarded by a repeater wireless node that is using a power detection procedure; selecting a communication configuration for use with the repeater wireless node that is using the power detection procedure; and transmitting an indication of the communication configuration for use with the repeater wireless node that is using the power detection procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
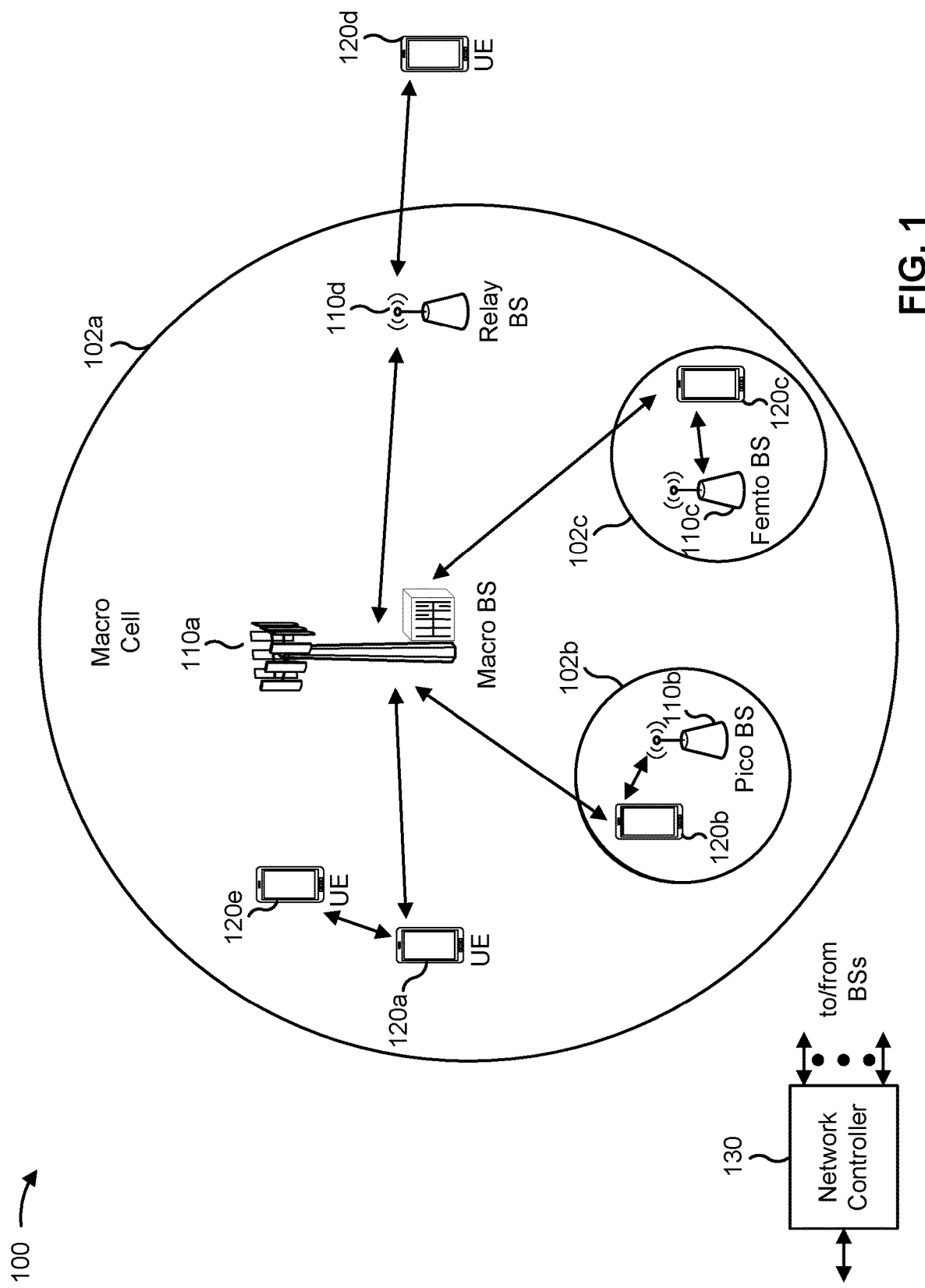
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
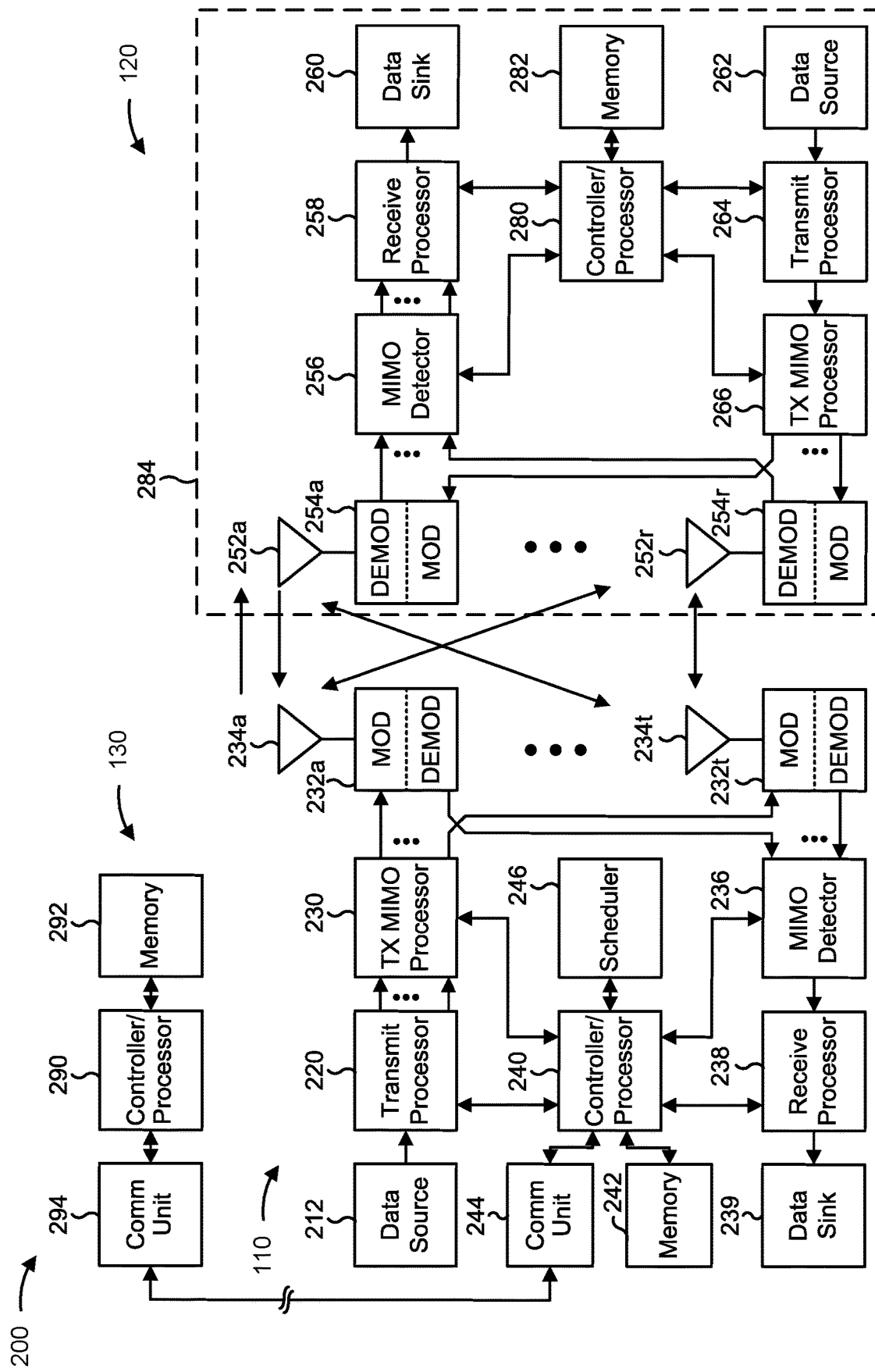
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-7).

Controller/processor 240 of base station 110, controller/processor 280 of UE 120, and/or any other component(s) of FIG. 2 may perform one or more techniques associated with communication configuration for multi-hop networks using repeaters, as described in more detail elsewhere herein. In some aspects, the wireless nodes described herein are the base station 110, are included in the base station 110, or include one or more components of the base station 110 shown in FIG. 2. In some aspects, the wireless nodes described herein are the UE 120, are included in the UE 120, or include one or more components of the UE 120 shown in FIG. 2. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the source wireless node includes means for selecting a communication configuration for use with a repeater wireless node that is using a power detection procedure; or means for transmitting a signal, to the repeater wireless node and to be forwarded by the repeater wireless node to a target wireless node, in accordance with the communication configuration selected for use with the repeater wireless node that is using the power detection procedure. In some aspects, the means for the source wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the source wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the repeater wireless node includes means for receiving a signal, from a source wireless node, in accordance with a source wireless node communication configuration selected for use with a power detection procedure of the repeater wireless node; means for performing the power detection procedure on the signal based at least in part on receiving the signal; means for configuring a repeater wireless node communication configuration based at least in part on performing the power detection procedure; or means for forwarding the signal to a target wireless node based at least in part on configuring the repeater wireless node communication configuration. In some aspects, the means for the repeater wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the repeater wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the control node includes means for determining that a transmission of a signal from a source wireless node to a target wireless node is to be forwarded by a repeater wireless node that is using a power detection procedure; means for selecting a communication configuration for use with the repeater wireless node that is using the power detection procedure; or means for transmitting an indication of the communication configuration for use with the repeater wireless node that is using the power detection procedure. In some aspects, the means for the control node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the control node to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
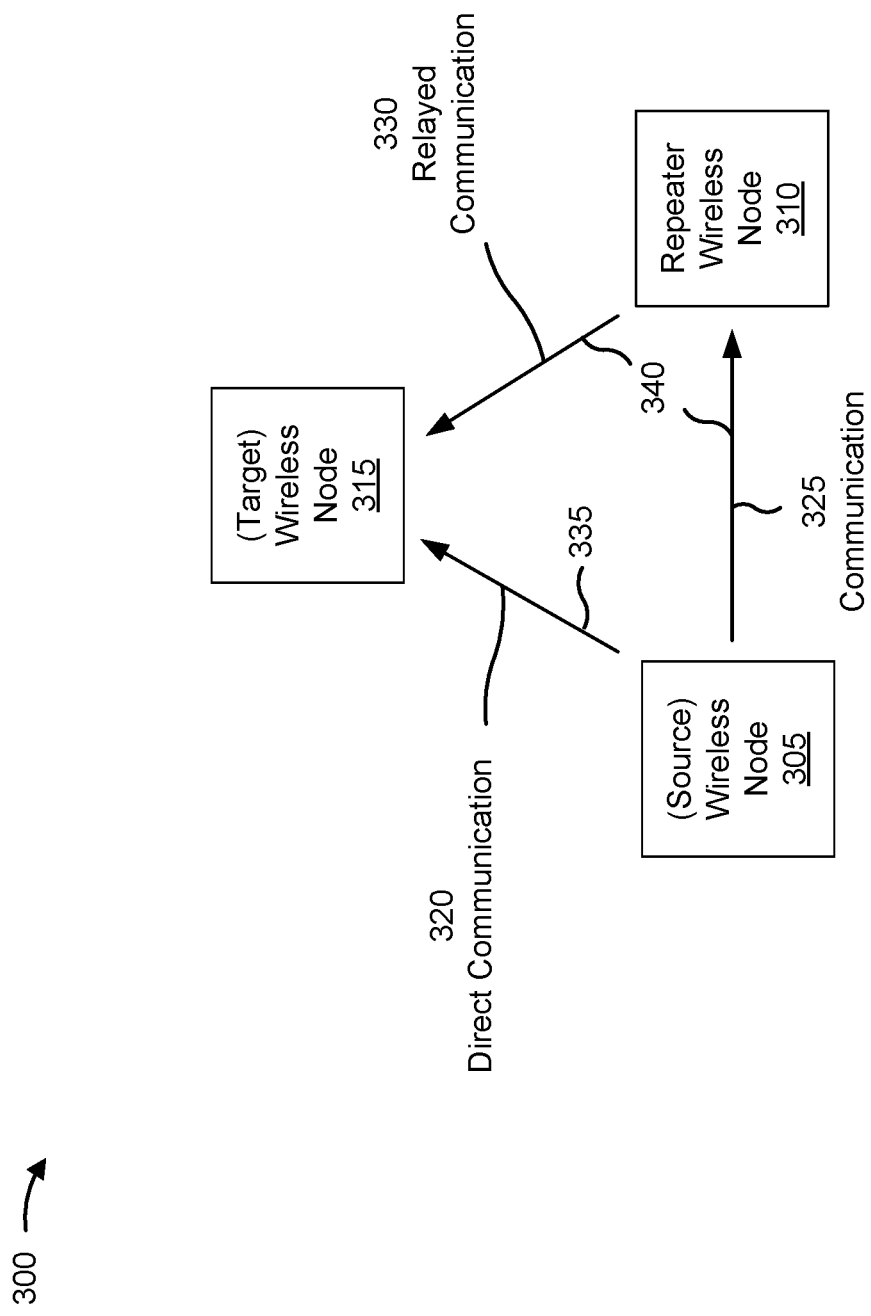
FIG. 3 is a diagram illustrating an example of a repeater wireless node that relays communications between a first wireless node and a second wireless node, in accordance with the present disclosure.

FIG. 3 is a diagram illustrating an example 300 of a repeater wireless node that relays communications between a first wireless node and a second wireless node, in accordance with the present disclosure. As shown, example 300 includes a source wireless node 305, a repeater wireless node 310, and a target wireless node 315. In example 300, the source wireless node 305 is a Tx device, and the repeater wireless node 310 is an Rx device. In some aspects, source wireless node 305, repeater wireless node 310, and/or target wireless node 315 may be implemented by UEs 120, BSs 110, or a combination thereof, among other examples. Wireless node 305 is referred to as a source wireless node and wireless node 315 is referred to as a target wireless node with respect to a communication in a first direction (from wireless node 305 to wireless node 315). However, with respect to another communication in a second direction (from wireless node 315 to wireless node 305), wireless node 305 may be the target wireless node and wireless node 315 may be the source wireless node.

As shown in FIG. 3, the source wireless node 305 may transmit a communication (e.g., data and/or control information) directly to the target wireless node 315 as a direct communication 320 and via a direct link 335. Additionally, or alternatively, the source wireless node 305 may transmit a communication (e.g., data and/or control information) indirectly to the target wireless node 315 via the repeater wireless node 310 and via an indirect link 340. For example, the source wireless node 305 may transmit the communication to the repeater wireless node 310 as a communication 325, and the repeater wireless node 310 may relay (e.g., forward or transmit) the communication to the target wireless node 315 as a communication 330. A communication transmitted via the indirect link 340 between the source wireless node 305 and the target wireless node 315 (e.g., in the communication 325 and the communication 330) passes through and is relayed by the repeater wireless node 310. In some aspects, source wireless node 305 may forgo transmission of a direct communication 320 and only transmit via an indirect communication 325 and 330.

Using the communication scheme shown in FIG. 3 may improve network performance and increase reliability by providing the source wireless node 305 with link diversity for communicating with the target wireless node 315 and/or with an extended coverage area as a result of repeater wireless node 310. For millimeter wave (e.g., frequency range 2, or FR2) communications, which are susceptible to link blockage and link impairment, this link diversity or extended coverage area improves reliability and prevents multiple retransmissions of data that may otherwise be retransmitted in order to achieve a successful communication. Similarly, for V2X communications, which may be associated with a limited spectrum for communications, this link diversity or extended coverage area improves reliability and prevents multiple retransmissions of data that may otherwise be retransmitted in order to achieve a successful communication. However, techniques described herein are not limited to millimeter wave communications, and may be used for sub-6 gigahertz (e.g., frequency range 1, or FR1) communications.

As indicated above, FIG. 3 is provided as an example. Other examples may differ from what is described with respect to FIG. 3.

In some communication systems, repeater wireless nodes, which may be termed "repeaters", may be deployed to extend coverage and/or provide spatial diversity for source wireless nodes. For example, when a BS is transmitting to a UE, the BS may transmit a first communication to a repeater and the repeater may forward or direct that first communication, as a second communication, to the UE, thereby extending the coverage of the BS. Similarly, the BS may transmit a first communication directly to the UE and a second communication to a repeater, which may forward or direct that second communication, as a third communication, to the UE, thereby providing link or spatial diversity. Similar schemes may be used for BS-to-BS communication, UE-to-BS communication, or UE-to-UE communication, among other examples.

One type of repeater wireless node may be termed a "traditional repeater" when the repeater wireless node is deployed with a fixed or semi-fixed configuration. For example, a traditional repeater may have a fixed transmission power, a fixed set of transmit or receive beams, or a fixed forwarding direction (e.g., a traditional repeater may be deployed to forward only downlink communications to the UE), among other examples. Another type of repeater wireless node may be termed a "smart repeater" when the repeater wireless node is dynamically re-configurable. For example, a smart repeater have a reconfigurable transmission power, a reconfigurable set of transmit or receive beams, a reconfigurable forwarding direction (e.g., a smart repeater may switch between an uplink-only mode, a downlink-only mode, or an uplink and downlink mode), among other examples. Some smart repeaters may autonomously set one or more reconfigurable parameters. For example, a smart repeater may perform measurements or receive reports of measurements and select a transmit power or transmit beam based at least in part on the measurements. Other smart repeaters may receive configuration information to set one or more reconfigurable parameters. For example, a smart repeater may receive a control message, from a control wireless node, that indicates a transmit power or transmit beam that the smart repeater is to use. In some cases, the control wireless node may be a source wireless node, a target wireless node, or another wireless node for the repeater wireless node, among other examples.

When a smart repeater is deployed with measurement capabilities, as described above, the smart repeater may use a power detector to measure a received power (e.g., an analog received power, among other examples). The smart repeater may use measurements of received power for acquiring time-division-duplexing (TDD) information (e.g., differentiating between downlink symbols and uplink symbols), acquiring beamforming configuration information (e.g., determining a beamforming configuration for subsequent communications), power status determination (e.g., determining whether a signal is being received and, if not, transitioning to a power saving state to reduce power consumption and avoid causing interference).

However, power detection, by a smart repeater, may be associated with a latency associated with measuring a receive power, determining a configuration based at least in part on the receive power, and applying the determined configuration. This latency issue may result in a degraded quality of one or more initial symbols at a beginning of a communication burst. Similarly, power detection, by a smart repeater, may be associated with a limited accuracy as a result of noise or interference, such as when a signal-to-interference-and-noise ratio (SINR) value is relatively low. This accuracy issue may result in non-optimized configuration determination, which may degrade communication performance.

Some aspects described herein enable repeater-aware communication configuration. For example, a source wireless node may transmit a communication to a repeater wireless node using a configuration determined to enable use of the repeater wireless node without degraded communication performance associated with power detection by the repeater wireless node. In this case, the source wireless node may, for example, use an extended cyclic prefix for an initial symbol of a communication burst, thereby enabling power detection and reducing an impact of a latency associated with power detection. Similarly, the source wireless node may transmit a dummy signal (e.g., a configured sequence of bits not used for conveying control information or data) for an initial symbol of a communication burst to enable power detection and avoid the latency associated with the power detection impacting non-dummy data, which is transmitted subsequently.

Figure 4:
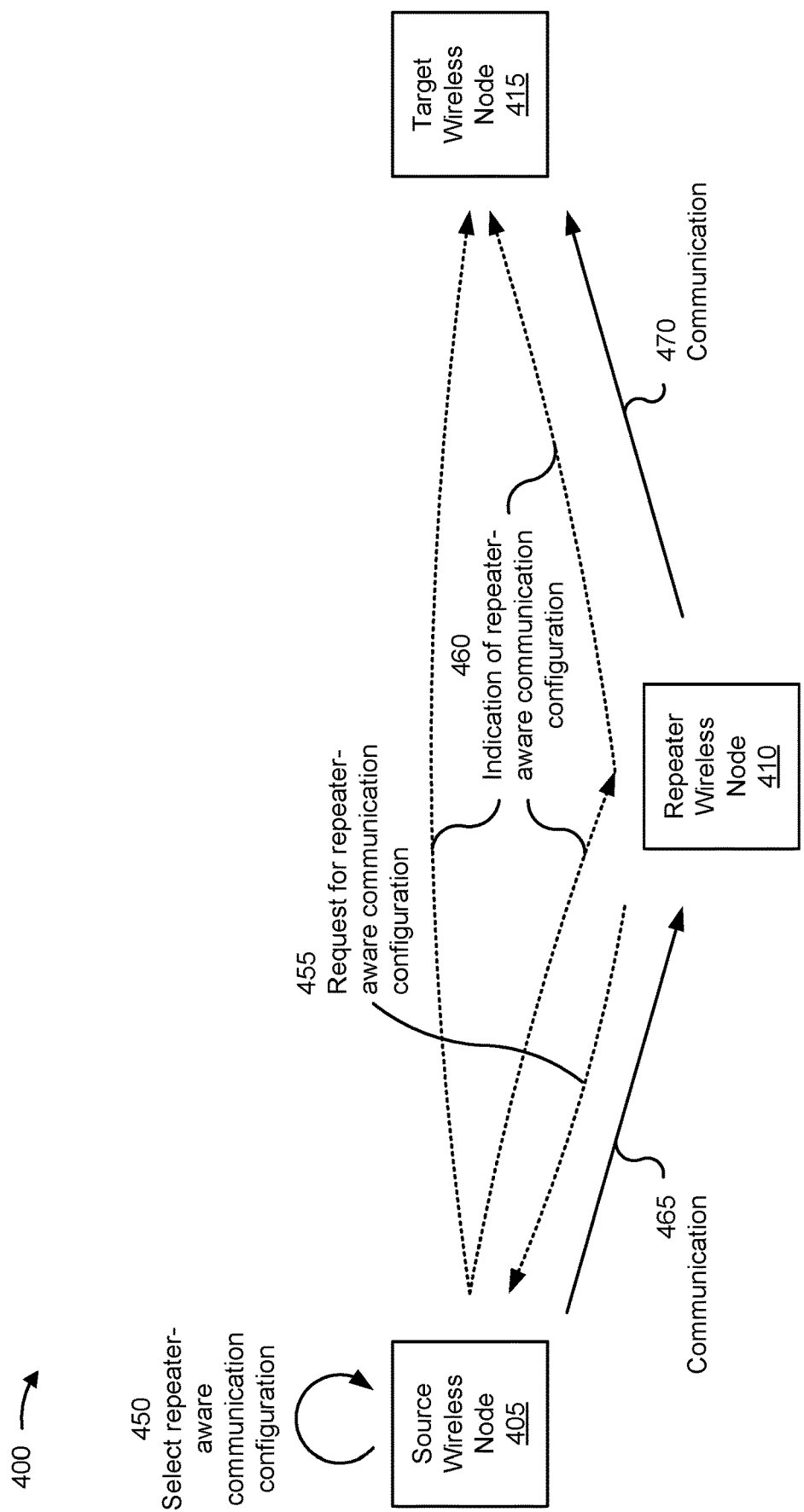
FIG. 4 is a diagram illustrating an example associated with communication configuration for multi-hop networks using repeaters, in accordance with the present disclosure.

FIG. 4 is a diagram illustrating an example 400 of communication configuration for multi-hop networks using repeaters, in accordance with the present disclosure. As shown in FIG. 4, a source wireless node 405, a repeater wireless node 410, and a target wireless node 415 may communicate with one another. In some aspects, source wireless node 405, repeater wireless node 410, and/or target wireless node 415 may be implemented by a BS 110 or a UE 120, among other examples.

As shown by reference number 450, source wireless node 405 may select a repeater-aware communication configuration. For example, source wireless node 405 may implement a communication configuration to account for a latency issue or accuracy issue associated with operation of repeater wireless node 410. In some aspects, source wireless node 405 may select the communication configuration based at least in part on received information. For example, source wireless node 405 may receive information from repeater wireless node 410 indicating that repeater wireless node 410 is capable of performing a measurement and self-adjusting a configuration (e.g., a capability indication, a device type, a device identifier, among other examples). In this case, source wireless node 405 may adopt a repeater-aware communication configuration to account for a latency associated with the measurement and self-adjustment. Additionally, or alternatively, source wireless node 405 may transmit a request that source wireless node 405 adopt the repeater-aware communication configuration, as shown by reference number 455.

Additionally, or alternatively, source wireless node 405 may receive information from a control wireless node (not shown) that causes source wireless node 405 to implement the repeater-aware communication configuration. For example, source wireless node 405 may receive, from a control wireless node, information indicating that repeater wireless node 410 is capable of self-configuration. In this case, source wireless node 405 may select one or more communication parameters to account for, for example, a latency associated with the self-configuration. Additionally, or alternatively, source wireless node 405 may receive information identifying the one or more communication parameters without receiving information explicitly indicating that repeater wireless node 410 is capable of self-configuration. For example, source wireless node 405 may receive information indicating the communication configuration and may implement the communication configuration.

In some aspects, the communication configuration may include an extended cyclic prefix. For example, source wireless node 405 may use a cyclic prefix of a first length for direct communications (or indirect communications using a traditional repeater) and may adopt a cyclic prefix with a second length (that is longer than the first length) for indirect communications (using a smart repeater). In this case, by using the extended cyclic prefix for, for example, one or more initial symbols of a communication burst or slot, source wireless node 405 enables improved power detection by repeater wireless node 410. Moreover, source wireless node 405 reduces an impact of latency associated with self-configuration by ensuring that any degraded communication occurs during the extended cyclic prefix rather than in other data that is being forwarded or directed by source wireless node 405. In some aspects, source wireless node 405 may adopt an increased subcarrier spacing (SCS) to enable the extended cyclic prefix. For example, source wireless node 405 may switch from a first SCS of a first size to a second SCS of a second size (that is larger than the first size) to enable use of an extended cyclic prefix.

In some aspects, the communication configuration may include transmission of a dummy signal. For example, source wireless node 405 may transmit a configured signal for one or more initial symbols of a communication burst or slot before transmitting control information or data that is to be forwarded or directed to target wireless node 415. In some aspects, the dummy signal may be configured to avoid causing issues with legacy receivers (e.g., target wireless nodes 415). For example, source wireless node 405 may configure a waveform or one or more bits of the dummy signal such that if target wireless node 415 is not configured to determine that the one or more initial symbols of the communication burst or slot convey a dummy signal, target wireless node 415 will not be able to process the one or more initial symbols. In this way, source wireless node 405 enables deployment in a communication system with legacy wireless nodes without the dummy signal being misinterpreted as, for example, control information or data.

Additionally, or alternatively, the dummy signal may convey no information (e.g., the dummy signal may convey a set of bits set to a dummy sequence, such as all "0"s or all "1"s. Additionally, or alternatively, the dummy signal may be a repetition signal. For example, source wireless node 405 may transmit, as a dummy signal before a first non-dummy signal, a repetition of the first non-dummy signal. In this way, source wireless node 405 uses the dummy signal to provide repetition of non-dummy information, thereby increasing a reliability of the non-dummy information. Additionally, or alternatively, the dummy signal may include information for repeater wireless node 410. For example, source wireless node 405 may include control signaling or data for repeater wireless node 410 (and not for forwarding or directing to a target wireless node 415) as a dummy signal before control information or data that is for forwarding or directing to target wireless node 415.

In some aspects, the communication configuration may include a transmit configuration. For example, source wireless node 405 may adjust a transmit power or transmit beam of one or more initial symbols. In this case, source wireless node 405 may use a first transmit power or transmit beam for the one or more initial symbols and a second transmit power or transmit beam for subsequent symbols. Source wireless node 405 may select the first transmit power or transmit beam to achieve, for example, a higher transmit power (e.g., a higher equivalent isotropically radiated power (EIRP)) for the one or more initial symbols. In this way, source wireless node 405 enables improved power detection by repeater wireless node 410.

In some aspects, the communication configuration may include an adjustment to a transmit timing. For example, source wireless node 405 may modify a transmit timing reference and may start transmitting at an earlier time than source wireless node 405 was scheduled or configured to transmit. In other words, if source wireless node 405 was to transmit at a time t to cause target wireless node 415 to receive a communication at time t+k, source wireless node 405 may switch to transmitting at a time t−n, where n is a time gap value. In this case, the time gap value may correspond to a latency associated with repeater wireless node 410 performing self-configuration (and/or repeating a communication), thereby ensuring that target wireless node 415 receives the forwarded or directed communication from repeater wireless node 410 at t+k despite the latency.

In some aspects, the communication configuration may include an adjustment to a gap or guard period. For example, source wireless node 405 may select a particular quantity of guard symbols or a particular length gap period between communication bursts (e.g., between uplink and downlink communication). In this way, source wireless node 405 improves an accuracy of power detection at repeater wireless node 410 and reduces an impact of a latency associated with repeater wireless node 410 by providing the gap or guard period to absorb the latency.

In some aspects, source wireless node 405 may signal the communication configuration to repeater wireless node 410 and/or target wireless node 415 (e.g., directly or via repeater wireless node 410), as shown by reference number 460. For example, source wireless node 405 may indicate that a first one or more symbols of a transmission is a dummy signal, thereby enabling repeater wireless node 410 to use the dummy signal for measurement and/or target wireless node 415 to ignore the dummy signal. Additionally, or alternatively, source wireless node 405 may signal another communication configuration adjustment to enable repeater wireless node 410 and/or target wireless node 415 to adjust respective communication configurations in accordance with the communication configuration adjustment.

As shown by reference numbers 465 and 470, source wireless node 405 may transmit a communication to repeater wireless node 410, which may forward or direct the communication to target wireless node 415. For example, source wireless node 405 may transmit the communication (e.g., with an extended cyclic prefix, an increased SCS, a dummy signal, a transmit configuration modification, a timing reference modification, a gap or guard period modification, or a combination thereof, among other examples) to repeater wireless node 410, which may self-adjust a configuration and forward or direct the communication to target wireless node 415.

As indicated above, FIG. 4 is provided as an example. Other examples may differ from what is described with respect to FIG. 4.

Figure 5:
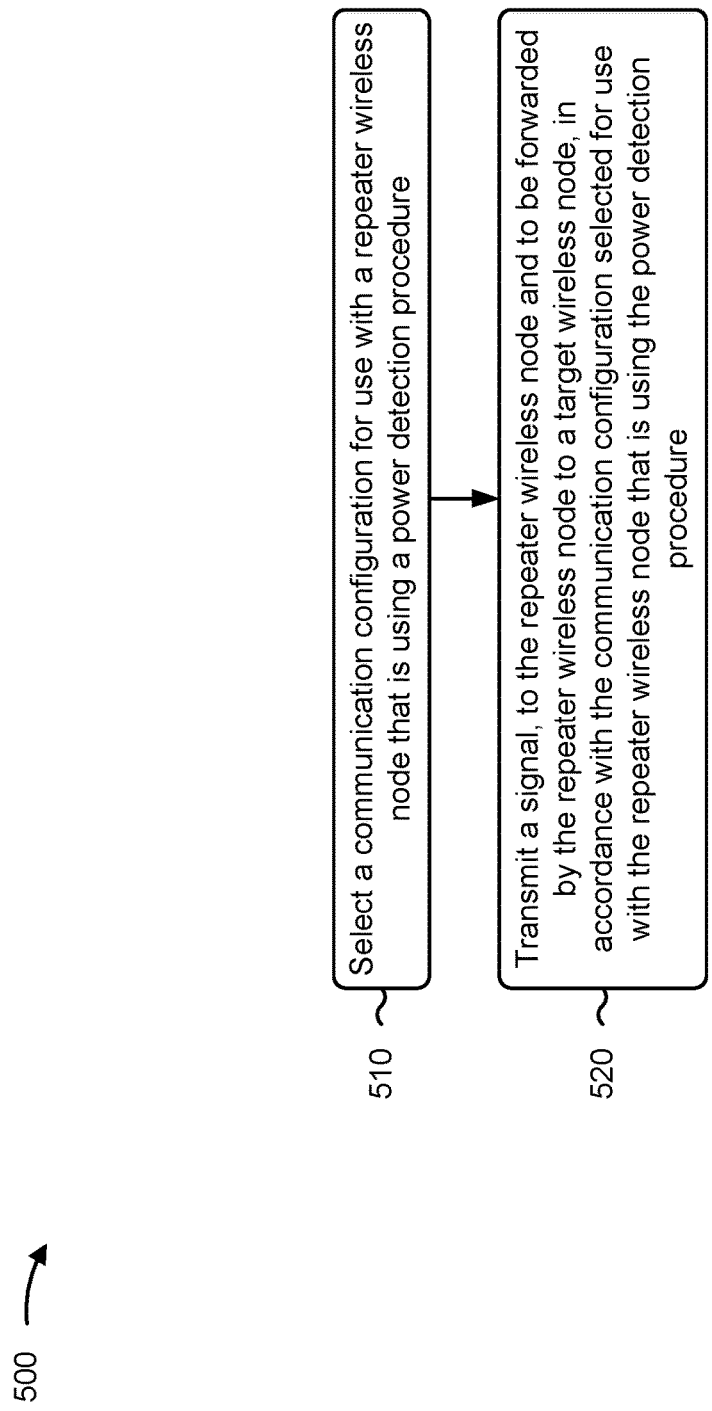
FIGS. 5-7 are diagrams illustrating example processes associated with communication configuration for multi-hop networks using repeaters, in accordance with the present disclosure.

FIG. 5 is a diagram illustrating an example process 500 performed, for example, by a source wireless node, in accordance with the present disclosure. Example process 500 is an example where the source wireless node (e.g., source wireless node 405) performs operations associated with communication configuration for multi-hop networks.

As shown in FIG. 5, in some aspects, process 500 may include selecting a communication configuration for use with a repeater wireless node that is using a power detection procedure (block 510). For example, the source wireless node (e.g., using selection component 808, depicted in FIG. 8) may select a communication configuration for use with a repeater wireless node that is using a power detection procedure, as described above.

As further shown in FIG. 5, in some aspects, process 500 may include transmitting a signal, to the repeater wireless node and to be forwarded by the repeater wireless node to a target wireless node, in accordance with the communication configuration selected for use with the repeater wireless node that is using the power detection procedure (block 520). For example, the source wireless node (e.g., using transmission component 804, depicted in FIG. 8) may transmit a signal, to the repeater wireless node and to be forwarded by the repeater wireless node to a target wireless node, in accordance with the communication configuration selected for use with the repeater wireless node that is using the power detection procedure, as described above.

Process 500 may include additional aspects, such as any single aspect or any combination of aspects described below and/or in connection with one or more other processes described elsewhere herein.

In a first aspect, process 500 includes receiving an indicator that the signal is for transmission to the repeater wireless node, and wherein the one or more processors, to select the communication configuration, are configured to selecting the communication configuration based at least in part on receiving the indicator that the signal is for transmission to the repeater wireless node.

In a second aspect, alone or in combination with the first aspect, process 500 includes receiving an indicator that the repeater wireless node is using the power detection procedure, and wherein the one or more processors, to select the communication configuration, are configured to selecting the communication configuration based at least in part on receiving the indicator that the repeater wireless node is using the power detection procedure.

In a third aspect, alone or in combination with one or more of the first and second aspects, the communication configuration includes an extended cyclic prefix for at least an initial symbol of a communication burst or a slot.

In a fourth aspect, alone or in combination with one or more of the first through third aspects, the communication configuration includes an increased subcarrier spacing.

In a fifth aspect, alone or in combination with one or more of the first through fourth aspects, the communication configuration includes transmission of a configured signal to the repeater wireless node before transmitting the signal to the repeater wireless node.

In a sixth aspect, alone or in combination with one or more of the first through fifth aspects, the communication configuration includes a first transmit power or transmit beam for a first one or more symbols of a transmission to the repeater wireless node and a second transmit power or transmit beam for a second one or more symbols of the transmission to the repeater wireless node, and wherein the first transmit power or transmit beam is associated with a higher effective isotropic radiated power relative to the second transmit power or transmit beam.

In a seventh aspect, alone or in combination with one or more of the first through sixth aspects, the communication configuration includes a configured timing reference, such that a timing of the transmitting the signal to the repeater wireless node is at a first time to cause, with a repeater delay at the repeater wireless node, the signal to arrive at the target wireless node at a configured second time.

In an eighth aspect, alone or in combination with one or more of the first through seventh aspects, the communication configuration includes a configured quantity of guard symbols between a first communication burst associated with a first direction and a second communication burst associated with another direction.

In a ninth aspect, alone or in combination with one or more of the first through eighth aspects, the first direction is one of an uplink or a downlink and the second direction is the other of the uplink or the downlink.

In a tenth aspect, alone or in combination with one or more of the first through ninth aspects, the first direction and the second direction are sidelink directions.

In an eleventh aspect, alone or in combination with one or more of the first through tenth aspects, process 500 includes indicating the communication configuration to at least one of the repeater wireless node or the target wireless node.

In a twelfth aspect, alone or in combination with one or more of the first through eleventh aspects, process 500 includes receiving an instruction to use the communication configuration from a control node.

In a thirteenth aspect, alone or in combination with one or more of the first through twelfth aspects, the control node is the target wireless node or the repeater wireless node.

In a fourteenth aspect, alone or in combination with one or more of the first through thirteenth aspects, process 500 includes receiving a request to adopt the communication configuration, and wherein the one or more processors, to select the communication configuration, are configured to selecting the communication configuration based at least in part on receiving the request to adopt the communication configuration.

In a fifteenth aspect, alone or in combination with one or more of the first through fourteenth aspects, the configured signal is not processable by the target wireless node not configured for use with the communication configuration.

In a sixteenth aspect, alone or in combination with one or more of the first through fifteenth aspects, the configured signal has a null information content.

In a seventeenth aspect, alone or in combination with one or more of the first through sixteenth aspects, the configured signal is a repetition of one or more symbols of the signal to be transmitted to the repeater wireless node.

In an eighteenth aspect, alone or in combination with one or more of the first through seventeenth aspects, the configured signal includes configuration information for the repeater wireless node.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
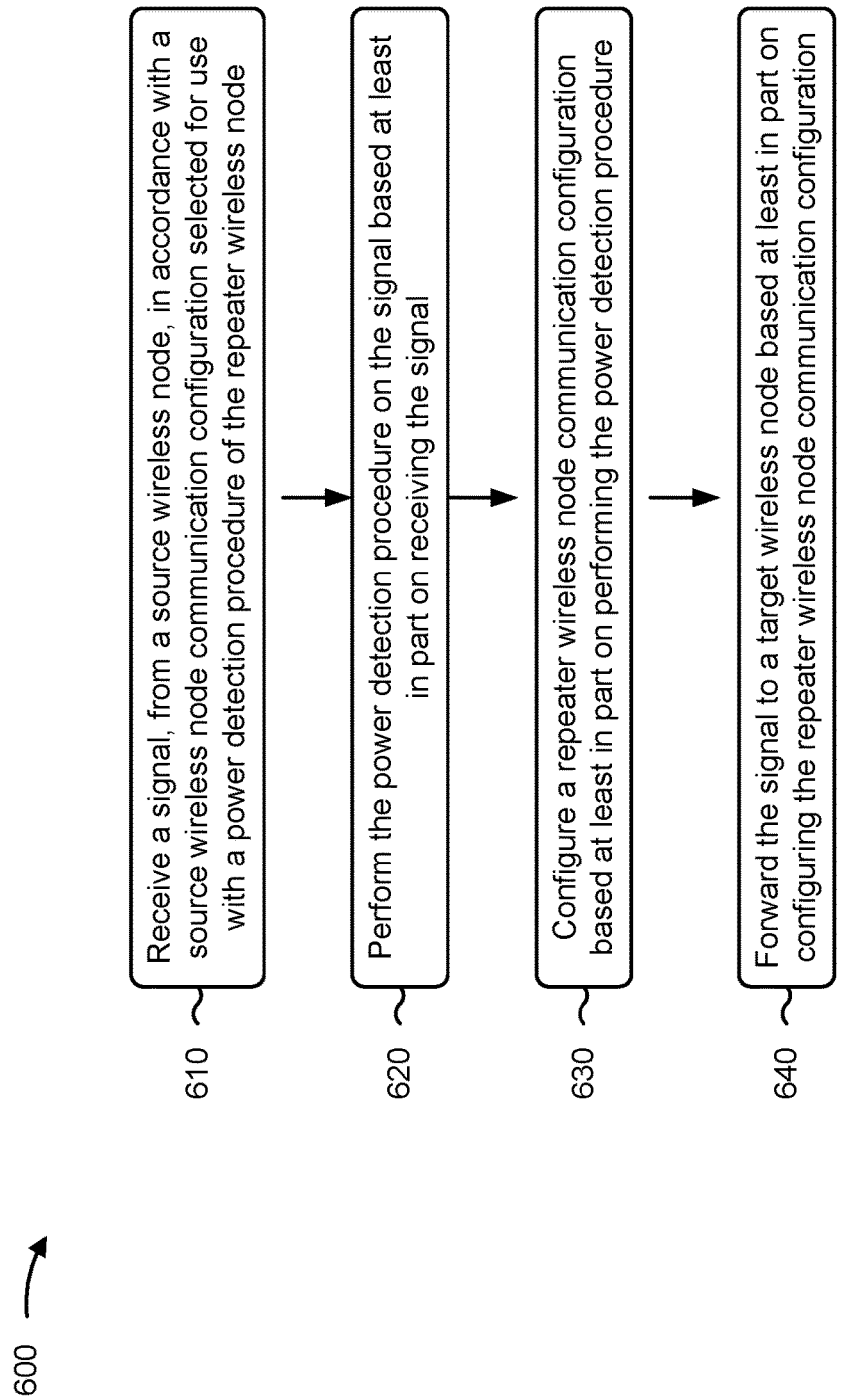

FIG. 6 is a diagram illustrating an example process 600 performed, for example, by a repeater wireless node, in accordance with the present disclosure. Example process 600 is an example where the repeater wireless node (e.g., repeater wireless node 410) performs operations associated with communication configuration for multi-hop networks.

As shown in FIG. 6, in some aspects, process 600 may include receiving a signal, from a source wireless node, in accordance with a source wireless node communication configuration selected for use with a power detection procedure of the repeater wireless node (block 610). For example, the repeater wireless node (e.g., using reception component 802, depicted in FIG. 8) may receive a signal, from a source wireless node, in accordance with a source wireless node communication configuration selected for use with a power detection procedure of the repeater wireless node, as described above.

As further shown in FIG. 6, in some aspects, process 600 may include performing the power detection procedure on the signal based at least in part on receiving the signal (block 620). For example, the repeater wireless node (e.g., using power detection component 810, depicted in FIG. 8) may perform the power detection procedure on the signal based at least in part on receiving the signal, as described above.

As further shown in FIG. 6, in some aspects, process 600 may include configuring a repeater wireless node communication configuration based at least in part on performing the power detection procedure (block 630). For example, the repeater wireless node (e.g., using configuration component 812, depicted in FIG. 8) may configure a repeater wireless node communication configuration based at least in part on performing the power detection procedure, as described above.

As further shown in FIG. 6, in some aspects, process 600 may include forwarding the signal to a target wireless node based at least in part on configuring the repeater wireless node communication configuration (block 640). For example, the repeater wireless node (e.g., using transmission component 804, depicted in FIG. 8) may forward the signal to a target wireless node based at least in part on configuring the repeater wireless node communication configuration, as described above.

Process 600 may include additional aspects, such as any single aspect or any combination of aspects described below and/or in connection with one or more other processes described elsewhere herein.

In a first aspect, process 600 includes transmitting an indicator that the repeater wireless node is using the power detection procedure to request selection of the source wireless node communication configuration.

In a second aspect, alone or in combination with the first aspect, the source wireless node communication configuration includes an extended cyclic prefix for at least an initial symbol of a communication burst or a slot.

In a third aspect, alone or in combination with one or more of the first and second aspects, the source wireless node communication configuration includes an increased subcarrier spacing.

In a fourth aspect, alone or in combination with one or more of the first through third aspects, the source wireless node communication configuration includes transmission of a configured signal to the repeater wireless node before transmitting the signal to the repeater wireless node.

In a fifth aspect, alone or in combination with one or more of the first through fourth aspects, the configured signal is not processable by the target wireless node not configured for use with the source wireless node communication configuration.

In a sixth aspect, alone or in combination with one or more of the first through fifth aspects, the configured signal has a null information content.

In a seventh aspect, alone or in combination with one or more of the first through sixth aspects, the configured signal is a repetition of one or more symbols of the signal to be received from the source wireless node.

In an eighth aspect, alone or in combination with one or more of the first through seventh aspects, the configured signal includes configuration information for the repeater wireless node.

In a ninth aspect, alone or in combination with one or more of the first through eighth aspects, the source wireless node communication configuration includes a first transmit power or transmit beam for a first one or more symbols of the signal and a second transmit power or transmit beam for a second one or more symbols of the signal, and wherein the first transmit power or transmit beam is associated with a higher effective isotropic radiated power relative to the second transmit power or transmit beam.

In a tenth aspect, alone or in combination with one or more of the first through ninth aspects, the source wireless node communication configuration includes a configured timing reference, such that a timing of the signal is such that, with a repeater delay at the repeater wireless node, the signal is to arrive at the target wireless node at a configured second time.

In an eleventh aspect, alone or in combination with one or more of the first through tenth aspects, the source wireless node communication configuration includes a configured quantity of guard symbols between a first communication burst associated with a first direction and a second communication burst associated with another direction.

In a twelfth aspect, alone or in combination with one or more of the first through eleventh aspects, the first direction is one of an uplink or a downlink and the second direction is the other of the uplink or the downlink.

In a thirteenth aspect, alone or in combination with one or more of the first through twelfth aspects, the first direction and the second direction are sidelink directions.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
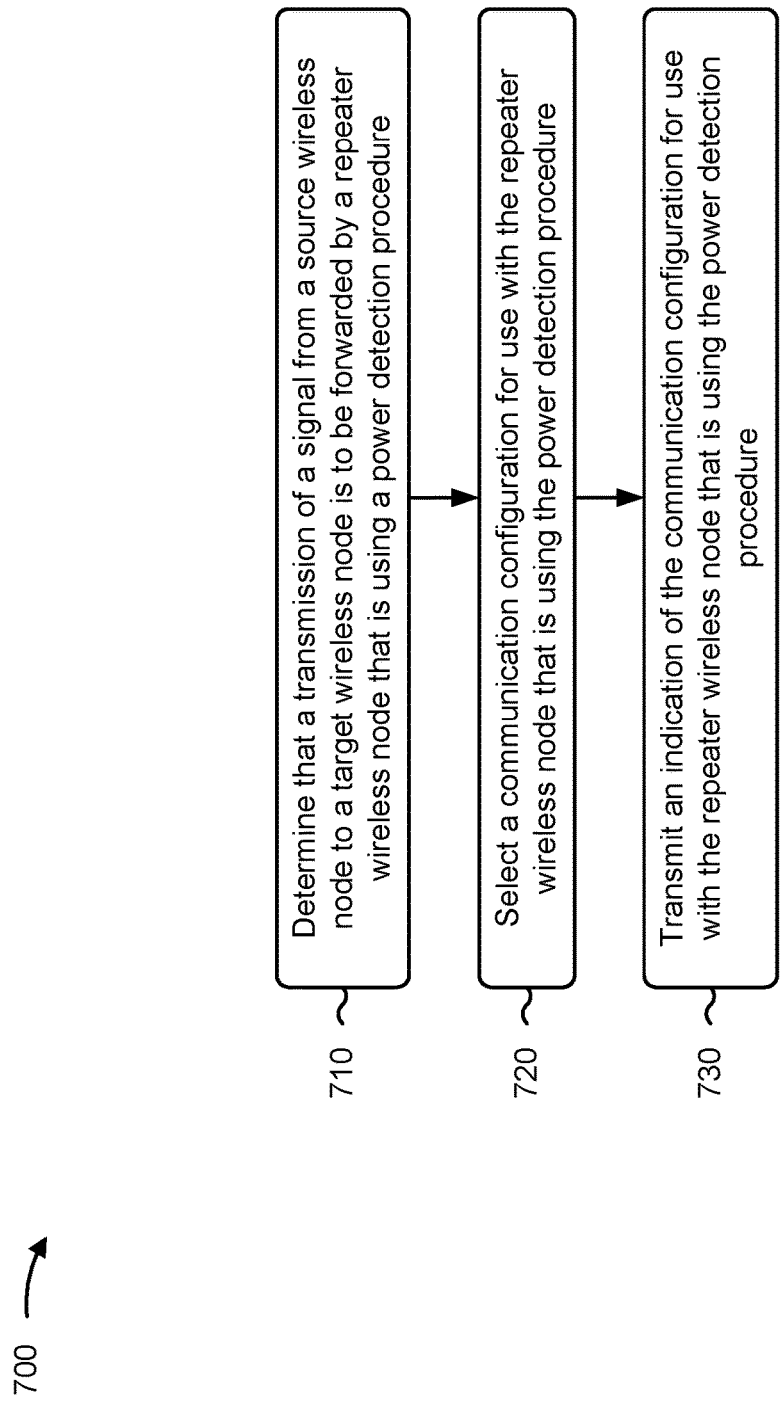

FIG. 7 is a diagram illustrating an example process 700 performed, for example, by a control node, in accordance with the present disclosure. Example process 700 is an example where the control node (e.g., repeater wireless node 410, target wireless node 415, or another node described herein) performs operations associated with communication configuration for multi-hop networks.

As shown in FIG. 7, in some aspects, process 700 may include determining that a transmission of a signal from a source wireless node to a target wireless node is to be forwarded by a repeater wireless node that is using a power detection procedure (block 710). For example, the control node (e.g., using determination component 814, depicted in FIG. 8) may determine that a transmission of a signal from a source wireless node to a target wireless node is to be forwarded by a repeater wireless node that is using a power detection procedure, as described above.

As further shown in FIG. 7, in some aspects, process 700 may include selecting a communication configuration for use with the repeater wireless node that is using the power detection procedure (block 720). For example, the control node (e.g., using selection component 808, depicted in FIG. 8) may select a communication configuration for use with the repeater wireless node that is using the power detection procedure, as described above.

As further shown in FIG. 7, in some aspects, process 700 may include transmitting an indication of the communication configuration for use with the repeater wireless node that is using the power detection procedure (block 730). For example, the control node (e.g., using transmission component 804, depicted in FIG. 8) may transmit an indication of the communication configuration for use with the repeater wireless node that is using the power detection procedure, as described above.

Process 700 may include additional aspects, such as any single aspect or any combination of aspects described below and/or in connection with one or more other processes described elsewhere herein.

In a first aspect, process 700 includes receiving an indicator that the signal is for transmission to the repeater wireless node for forwarding to the target wireless.

In a second aspect, alone or in combination with the first aspect, the indicator is received from at least one of the source wireless node, the repeater wireless node, or the target wireless node.

In a third aspect, alone or in combination with one or more of the first and second aspects, process 700 includes receiving an indicator that the repeater wireless node is using the power detection procedure, and wherein the one or more processors, to select the communication configuration, are configured to selecting the communication configuration based at least in part on receiving the indicator that the repeater wireless node is using the power detection procedure.

In a fourth aspect, alone or in combination with one or more of the first through third aspects, the communication configuration includes an extended cyclic prefix for at least an initial symbol of a communication burst or a slot.

In a fifth aspect, alone or in combination with one or more of the first through fourth aspects, the communication configuration includes an increased subcarrier spacing.

In a sixth aspect, alone or in combination with one or more of the first through fifth aspects, the communication configuration includes transmission of a configured signal to the repeater wireless node before the transmission of the signal to the repeater wireless node.

In a seventh aspect, alone or in combination with one or more of the first through sixth aspects, the configured signal is not processable by the target wireless node not configured for use with the communication configuration.

In an eighth aspect, alone or in combination with one or more of the first through seventh aspects, the configured signal has a null information content.

In a ninth aspect, alone or in combination with one or more of the first through eighth aspects, the configured signal is a repetition of one or more symbols of the signal to be transmitted to the repeater wireless node.

In a tenth aspect, alone or in combination with one or more of the first through ninth aspects, the configured signal includes configuration information for the repeater wireless node.

In an eleventh aspect, alone or in combination with one or more of the first through tenth aspects, the communication configuration includes a first transmit power or transmit beam for a first one or more symbols of the signal and a second transmit power or transmit beam for a second one or more symbols of the signal, and wherein the first transmit power or transmit beam is associated with a higher effective isotropic radiated power relative to the second transmit power or transmit beam.

In a twelfth aspect, alone or in combination with one or more of the first through eleventh aspects, the communication configuration includes a configured timing reference, such that a timing of the transmission of the signal to the repeater wireless node is at a first time to cause, with a repeater delay at the repeater wireless node, the signal to arrive at the target wireless node at a configured second time.

In a thirteenth aspect, alone or in combination with one or more of the first through twelfth aspects, the communication configuration includes a configured quantity of guard symbols between a first communication burst associated with a first direction and a second communication burst associated with another direction.

In a fourteenth aspect, alone or in combination with one or more of the first through thirteenth aspects, the first direction is one of an uplink or a downlink and the second direction is the other of the uplink or the downlink.

In a fifteenth aspect, alone or in combination with one or more of the first through fourteenth aspects, the first direction and the second direction are sidelink directions.

In a sixteenth aspect, alone or in combination with one or more of the first through fifteenth aspects, process 700 includes receiving a request to select the communication configuration, and wherein the one or more processors, to select the communication configuration, are configured to selecting the communication configuration based at least in part on receiving the request to select the communication configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
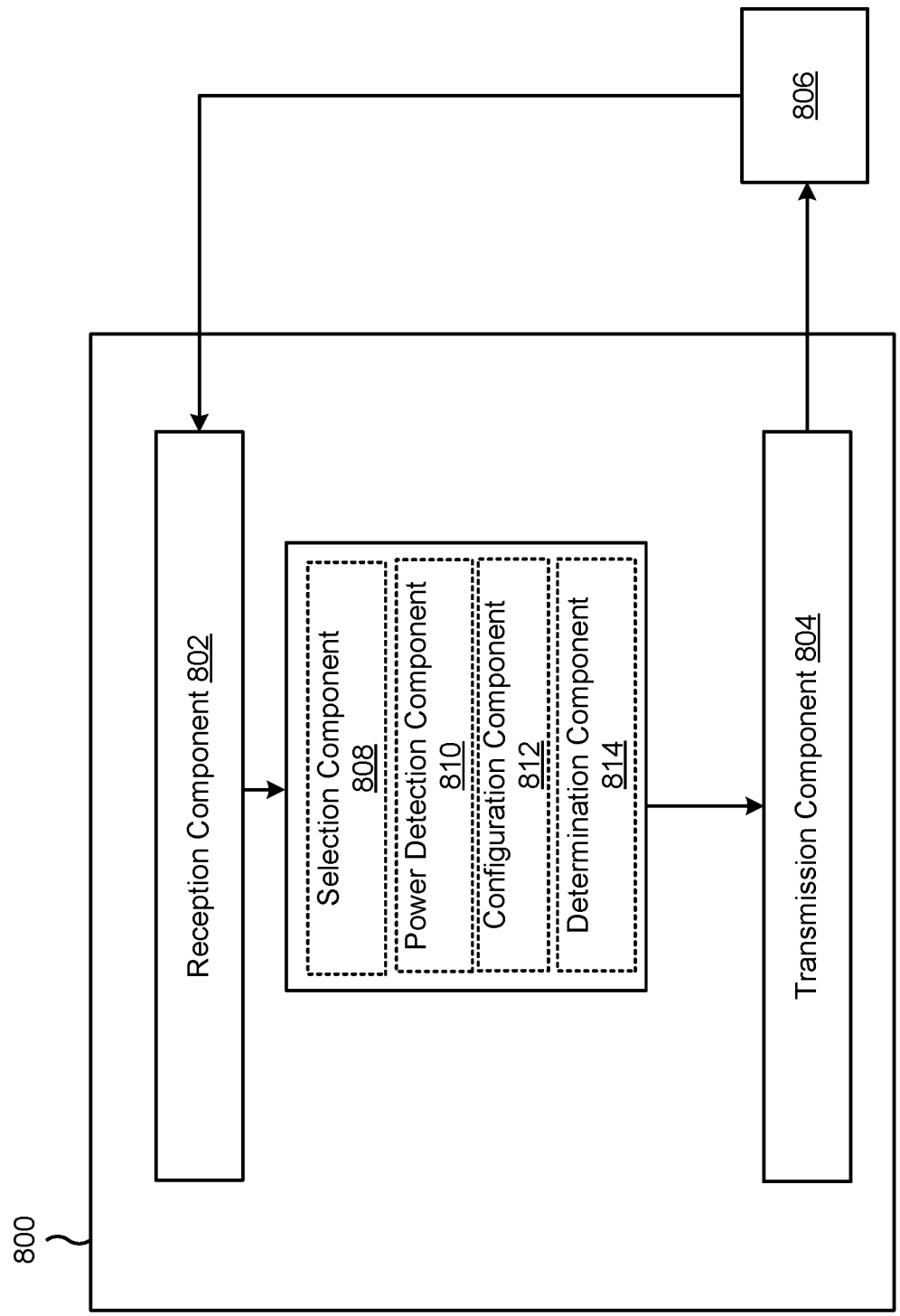
FIG. 8 is a block diagram of an example apparatus for wireless communication, in accordance with the present disclosure.

FIG. 8 is a block diagram of an example apparatus 800 for wireless communication. The apparatus 800 may be a wireless node (e.g., a source wireless node, a repeater wireless node, or a target wireless node) or a control node, or a wireless node or control node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a selection component 808, a power detection component 810, a configuration component 812, or a determination component 814, among other examples.

In some aspects, the apparatus 800 may be configured to perform one or more operations described herein in connection with FIGS. 4-7. Additionally, or alternatively, the apparatus 800 may be configured to perform one or more processes described herein, such as process 500 of FIG. 5, process 600 of FIG. 6, process 700 of FIG. 7, among other examples. In some aspects, the apparatus 800 and/or one or more components shown in FIG. 8 may include one or more components of the wireless node described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the wireless node described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless node described above in connection with FIG. 2. In some aspects, the transmission component 804 may be co-located with the reception component 802 in a transceiver.

The selection component 808 may select a communication configuration for use with a repeater wireless node. The transmission component 804 may transmit information to the repeater wireless node in accordance with the communication configuration selected for use with the repeater wireless node.

The reception component 802 may receive an indicator that the information is for transmission to the repeater wireless node. The reception component 802 may receive an indicator that the repeater wireless node is using a power detection procedure. The transmission component 804 may indicate the communication configuration to the repeater wireless node. The reception component 802 may receive an instruction to use the communication configuration from a control wireless node. The reception component 802 may receive a request to adopt the communication configuration.

The selection component 808 may select a communication configuration for use with a repeater wireless node that is using a power detection procedure. The transmission component 804 may transmit a signal, to the repeater wireless node and to be forwarded by the repeater wireless node to a target wireless node, in accordance with the communication configuration selected for use with the repeater wireless node that is using the power detection procedure.

The reception component 802 may receive a signal, from a source wireless node, in accordance with a source wireless node communication configuration selected for use with a power detection procedure of the repeater wireless node. The power detection component 810 may perform the power detection procedure on the signal based at least in part on receiving the signal. The configuration component 812 may configure a repeater wireless node communication configuration based at least in part on performing the power detection procedure. The transmission component 804 may forward the signal to a target wireless node based at least in part on configuring the repeater wireless node communication configuration.

The determination component 814 may determine that a transmission of a signal from a source wireless node to a target wireless node is to be forwarded by a repeater wireless node that is using a power detection procedure. The selection component 808 may select a communication configuration for use with the repeater wireless node that is using the power detection procedure. The transmission component 804 may transmit an indication of the communication configuration for use with the repeater wireless node that is using the power detection procedure.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a source wireless node, comprising: selecting a communication configuration for use with a repeater wireless node that is using a power detection procedure; and transmitting a signal, to the repeater wireless node and to be forwarded by the repeater wireless node to a target wireless node, in accordance with the communication configuration selected for use with the repeater wireless node that is using the power detection procedure.

Aspect 2: The method of Aspect 1, further comprising: receiving an indicator that the signal is for transmission to the repeater wireless node; and comprising: selecting the communication configuration based at least in part on receiving the indicator that the signal is for transmission to the repeater wireless node.

Aspect 3: The method of any of Aspects 1 to 2, further comprising: receiving an indicator that the repeater wireless node is using the power detection procedure; and comprising: selecting the communication configuration based at least in part on receiving the indicator that the repeater wireless node is using the power detection procedure.

Aspect 4: The method of any of Aspects 1 to 3, wherein the communication configuration includes an extended cyclic prefix for at least an initial symbol of a communication burst or a slot.

Aspect 5: The method of any of Aspects 1 to 4, wherein the communication configuration includes an increased subcarrier spacing.

Aspect 6: The method of any of Aspects 1 to 5, wherein the communication configuration includes transmission of a configured signal to the repeater wireless node before transmitting the signal to the repeater wireless node.

Aspect 7: The method of any of Aspects 1 to 6, wherein the configured signal is not processable by the target wireless node not configured for use with the communication configuration.

Aspect 8: The method of any of Aspects 1 to 7, wherein the configured signal has a null information content.

Aspect 9: The method of any of Aspects 1 to 8, wherein the configured signal is a repetition of one or more symbols of the signal to be transmitted to the repeater wireless node.

Aspect 10: The method of any of Aspects 1 to 9, wherein the configured signal includes information for the repeater wireless node.

Aspect 11: The method of any of Aspects 1 to 10, wherein the communication configuration includes a first transmit power or transmit beam for a first one or more symbols of a transmission to the repeater wireless node and a second transmit power or transmit beam for a second one or more symbols of the transmission to the repeater wireless node, and wherein the first transmit power or transmit beam is associated with a higher effective isotropic radiated power relative to the second transmit power or transmit beam.

Aspect 12: The method of any of Aspects 1 to 11, wherein the communication configuration includes a configured timing reference, such that a timing of the transmitting the signal to the repeater wireless node is at a first time to cause, with a repeater delay at the repeater wireless node, the signal to arrive at the target wireless node at a configured second time.

Aspect 13: The method of any of Aspects 1 to 12, wherein the communication configuration includes a configured quantity of guard symbols between a first communication burst associated with a first direction and a second communication burst associated with another direction.

Aspect 14: The method of any of Aspects 1 to 13, wherein the first direction is one of an uplink or a downlink and the second direction is the other of the uplink or the downlink.

Aspect 15: The method of Aspect 13, wherein the first direction and the second direction are sidelink directions.

Aspect 16: The method of any of Aspects 1 to 15, further comprising: indicating the communication configuration to at least one of the repeater wireless node or the target wireless node.

Aspect 17: The method of any of Aspects 1 to 16, further comprising: receiving an instruction to use the communication configuration from a control node.

Aspect 18: The method of Aspect 17, wherein the control node is the target wireless node or the repeater wireless node.

Aspect 19: The method of any of Aspects 1 to 18, further comprising: receiving a request to adopt the communication configuration; and comprising: selecting the communication configuration based at least in part on receiving the request to adopt the communication configuration.

Aspect 20: A method of wireless communication performed by a repeater wireless node, comprising: receiving a signal, from a source wireless node, in accordance with a source wireless node communication configuration selected for use with a power detection procedure of the repeater wireless node; performing the power detection procedure on the signal based at least in part on receiving the signal; configuring a repeater wireless node communication configuration based at least in part on performing the power detection procedure; and forwarding the signal to a target wireless node based at least in part on configuring the repeater wireless node communication configuration.

Aspect 21: The method of Aspect 20, further comprising: transmitting an indicator that the repeater wireless node is using the power detection procedure to request selection of the source wireless node communication configuration.

Aspect 22: The method of any of Aspects 20 to 21, wherein the source wireless node communication configuration includes an extended cyclic prefix for at least an initial symbol of a communication burst or a slot.

Aspect 23: The method of any of Aspects 20 to 22, wherein the source wireless node communication configuration includes an increased subcarrier spacing.

Aspect 24: The method of any of Aspects 20 to 23, wherein the source wireless node communication configuration includes transmission of a configured signal to the repeater wireless node before transmitting the signal to the repeater wireless node.

Aspect 25: The method of Aspect 24, wherein the configured signal is not processable by the target wireless node not configured for use with the source wireless node communication configuration.

Aspect 26: The method of any of Aspects 24 to 25, wherein the configured signal has a null information content.

Aspect 27: The method of any of Aspects 24 to 26, wherein the configured signal is a repetition of one or more symbols of the signal to be received from the source wireless node.

Aspect 28: The method of any of Aspects 24 to 27, the configured signal includes information for the repeater wireless node.

Aspect 29: The method of any of Aspects 20 to 28, wherein the source wireless node communication configuration includes a first transmit power or transmit beam for a first one or more symbols of the signal and a second transmit power or transmit beam for a second one or more symbols of the signal, and wherein the first transmit power or transmit beam is associated with a higher effective isotropic radiated power relative to the second transmit power or transmit beam.

Aspect 30: The method of any of Aspects 20 to 29, wherein the source wireless node communication configuration includes a configured timing reference, such that a timing of the signal is such that, with a repeater delay at the repeater wireless node, the signal is to arrive at the target wireless node at a configured second time.

Aspect 31: The method of any of Aspects 20 to 30, wherein the source wireless node communication configuration includes a configured quantity of guard symbols between a first communication burst associated with a first direction and a second communication burst associated with another direction.

Aspect 32: The method of Aspect 31, wherein the first direction is one of an uplink or a downlink and the second direction is the other of the uplink or the downlink.

Aspect 33: The method of any of Aspects 31 to 32, wherein the first direction and the second direction are sidelink directions.

Aspect 34: A method of wireless communication performed by a control node, comprising: determining that a transmission of a signal from a source wireless node to a target wireless node is to be forwarded by a repeater wireless node that is using a power detection procedure; selecting a communication configuration for use with the repeater wireless node that is using the power detection procedure; and transmitting an indication of the communication configuration for use with the repeater wireless node that is using the power detection procedure.

Aspect 35: The method of Aspect 34, wherein configuring to determine that the transmission of the signal is from the source wireless node to the target wireless node comprises: receiving an indicator that the signal is for transmission to the repeater wireless node for forwarding to the target wireless.

Aspect 36: The method of Aspect 35, wherein the indicator is received from at least one of the source wireless node, the repeater wireless node, or the target wireless node.

Aspect 37: The method of any of Aspects 34 to 36, further comprising: receiving an indicator that the repeater wireless node is using the power detection procedure; and comprising: selecting the communication configuration based at least in part on receiving the indicator that the repeater wireless node is using the power detection procedure.

Aspect 38: The method of any of Aspects 34 to 37, wherein the communication configuration includes an extended cyclic prefix for at least an initial symbol of a communication burst or a slot.

Aspect 39: The method of any of Aspects 34 to 38, wherein the communication configuration includes an increased subcarrier spacing.

Aspect 40: The method of any of Aspects 34 to 39, wherein the communication configuration includes transmission of a configured signal to the repeater wireless node before the transmission of the signal to the repeater wireless node.

Aspect 41: The method of Aspect 40, wherein the configured signal is not processable by the target wireless node not configured for use with the communication configuration.

Aspect 42: The method of any of Aspects 40 to 41, wherein the configured signal has a null information content.

Aspect 43: The method of any of Aspects 40 to 42, wherein the configured signal is a repetition of one or more symbols of the signal to be transmitted to the repeater wireless node.

Aspect 44: The method of any of Aspects 40 to 43 comprising: information for the repeater wireless node.

Aspect 45: The method of any of Aspects 34 to 44, wherein the communication configuration includes a first transmit power or transmit beam for a first one or more symbols of the signal and a second transmit power or transmit beam for a second one or more symbols of the signal, and wherein the first transmit power or transmit beam is associated with a higher effective isotropic radiated power relative to the second transmit power or transmit beam.

Aspect 46: The method of any of Aspects 34 to 45, wherein the communication configuration includes a configured timing reference, such that a timing of the transmission of the signal to the repeater wireless node is at a first time to cause, with a repeater delay at the repeater wireless node, the signal to arrive at the target wireless node at a configured second time.

Aspect 47: The method of any of Aspects 34 to 46, wherein the communication configuration includes a configured quantity of guard symbols between a first communication burst associated with a first direction and a second communication burst associated with another direction.

Aspect 48: The method of Aspect 47, wherein the first direction is one of an uplink or a downlink and the second direction is the other of the uplink or the downlink.

Aspect 49: The method of any of Aspects 47 to 48, wherein the first direction and the second direction are sidelink directions.

Aspect 50: The method of any of Aspects 34 to 49, further comprising: receiving a request to select the communication configuration; and comprising: selecting the communication configuration based at least in part on receiving the request to select the communication configuration.

Aspect 51: An apparatus for wireless communication at a device, comprising a processor; memory coupled with the processor; and instructions stored in the memory and executable by the processor to cause the apparatus to perform the method of one or more Aspects of Aspects 1-19.

Aspect 52: A device for wireless communication, comprising a memory and one or more processors coupled to the memory, the memory and the one or more processors configured to perform the method of one or more Aspects of Aspects 1-19.

Aspect 53: An apparatus for wireless communication, comprising at least one means for performing the method of one or more Aspects of Aspects 1-19.

Aspect 54: A non-transitory computer-readable medium storing code for wireless communication, the code comprising instructions executable by a processor to perform the method of one or more Aspects of Aspects 1-19.

Aspect 55: A non-transitory computer-readable medium storing a set of instructions for wireless communication, the set of instructions comprising one or more instructions that, when executed by one or more processors of a device, cause the device to perform the method of one or more Aspects of Aspects 1-19.

Aspect 56: An apparatus for wireless communication at a device, comprising a processor; memory coupled with the processor; and instructions stored in the memory and executable by the processor to cause the apparatus to perform the method of one or more Aspects of Aspects 20-33.

Aspect 57: A device for wireless communication, comprising a memory and one or more processors coupled to the memory, the memory and the one or more processors configured to perform the method of one or more Aspects of Aspects 20-33.

Aspect 58: An apparatus for wireless communication, comprising at least one means for performing the method of one or more Aspects of Aspects 20-33.

Aspect 59: A non-transitory computer-readable medium storing code for wireless communication, the code comprising instructions executable by a processor to perform the method of one or more Aspects of Aspects 20-33.

Aspect 60: A non-transitory computer-readable medium storing a set of instructions for wireless communication, the set of instructions comprising one or more instructions that, when executed by one or more processors of a device, cause the device to perform the method of one or more Aspects of Aspects 20-33.

Aspect 61: An apparatus for wireless communication at a device, comprising a processor; memory coupled with the processor; and instructions stored in the memory and executable by the processor to cause the apparatus to perform the method of one or more Aspects of Aspects 34-50.

Aspect 62: A device for wireless communication, comprising a memory and one or more processors coupled to the memory, the memory and the one or more processors configured to perform the method of one or more Aspects of Aspects 34-50.

Aspect 63: An apparatus for wireless communication, comprising at least one means for performing the method of one or more Aspects of Aspects 34-50.

Aspect 64: A non-transitory computer-readable medium storing code for wireless communication, the code comprising instructions executable by a processor to perform the method of one or more Aspects of Aspects 34-50.

Aspect 65: A non-transitory computer-readable medium storing a set of instructions for wireless communication, the set of instructions comprising one or more instructions that, when executed by one or more processors of a device, cause the device to perform the method of one or more Aspects of Aspects 34-50.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A source wireless node for wireless communication, comprising:
    a memory; and
    one or more processors, coupled to the memory, configured to:
        select a communication configuration for use with a repeater wireless node that is using a power detection procedure, the communication configuration including a first transmit power or transmit beam for a first one or more symbols of a transmission to the repeater wireless node and a second transmit power or transmit beam for a second one or more symbols of the transmission to the repeater wireless node, and the first transmit power or transmit beam being associated with a higher effective isotropic radiated power relative to the second transmit power or transmit beam; and
        transmit a signal, to the repeater wireless node and to be forwarded by the repeater wireless node to a target wireless node, in accordance with the communication configuration selected for use with the repeater wireless node that is using the power detection procedure.

2. The source wireless node of claim 1, wherein the one or more processors are further configured to:
    receive an indicator that the signal is for transmission to the repeater wireless node; and
    wherein the one or more processors, to select the communication configuration, are configured to:
        select the communication configuration based at least in part on receiving the indicator that the signal is for transmission to the repeater wireless node.

3. The source wireless node of claim 1, wherein the one or more processors are further configured to:
    receive an indicator that the repeater wireless node is using the power detection procedure; and
    wherein the one or more processors, to select the communication configuration, are configured to:
        select the communication configuration based at least in part on receiving the indicator that the repeater wireless node is using the power detection procedure.

4. The source wireless node of claim 1, wherein the communication configuration further includes an extended cyclic prefix for at least an initial symbol of a communication burst or a slot.

5. The source wireless node of claim 1, wherein the communication configuration further includes an increased subcarrier spacing.

6. The source wireless node of claim 1, wherein the communication configuration further includes transmission of a configured signal to the repeater wireless node before transmitting the signal to the repeater wireless node.

7. The source wireless node of claim 6, wherein the configured signal is not processable by the target wireless node not configured for use with the communication configuration.

8. The source wireless node of claim 6, wherein the configured signal has a null information content.

9. The source wireless node of claim 6, wherein the configured signal is a repetition of one or more symbols of the signal to be transmitted to the repeater wireless node.

10. The source wireless node of claim 6, wherein the configured signal includes configuration information for the repeater wireless node.

11. The source wireless node of claim 1, wherein the communication configuration further includes a configured timing reference, such that a timing of the transmitting the signal to the repeater wireless node is at a first time to cause, with a repeater delay at the repeater wireless node, the signal to arrive at the target wireless node at a configured second time.

12. The source wireless node of claim 1, wherein the communication configuration further includes a configured quantity of guard symbols between a first communication burst associated with a first direction and a second communication burst associated with another direction.

13. The source wireless node of claim 12, wherein the first direction is one of an uplink or a downlink and the second direction is the other of the uplink or the downlink.

14. The source wireless node of claim 12, wherein the first direction and the second direction are sidelink directions.

15. The source wireless node of claim 1, wherein the one or more processors are further configured to:
    indicate the communication configuration to at least one of the repeater wireless node or the target wireless node.

16. The source wireless node of claim 1, wherein the one or more processors are further configured to:

receive an instruction to use the communication configuration from a control node.

17. The source wireless node of claim 16, wherein the control node is the target wireless node or the repeater wireless node.

18. The source wireless node of claim 1, wherein the one or more processors are further configured to:
receive a request to adopt the communication configuration; and
wherein the one or more processors, to select the communication configuration, are configured to:
select the communication configuration based at least in part on receiving the request to adopt the communication configuration.

19. A repeater wireless node for wireless communication, comprising:
a memory; and
one or more processors, coupled to the memory, configured to:
receive a signal, from a source wireless node, in accordance with a source wireless node communication configuration selected for use with a power detection procedure of the repeater wireless node, the source wireless node communication configuration including a first transmit power or transmit beam for a first one or more symbols of a transmission to the repeater wireless node and a second transmit power or transmit beam for a second one or more symbols of the transmission to the repeater wireless node, and the first transmit power or transmit beam being associated with a higher effective isotropic radiated power relative to the second transmit power or transmit beam;
perform the power detection procedure on the signal based at least in part on receiving the signal;
configure a repeater wireless node communication configuration based at least in part on performing the power detection procedure; and
forward the signal to a target wireless node based at least in part on configuring the repeater wireless node communication configuration.

20. The repeater wireless node of claim 19, wherein the one or more processors are further configured to:
transmit an indicator that the repeater wireless node is using the power detection procedure to request selection of the source wireless node communication configuration.

21. The repeater wireless node of claim 19, wherein the source wireless node communication configuration further includes an extended cyclic prefix for at least an initial symbol of a communication burst or a slot.

22. The repeater wireless node of claim 19, wherein the source wireless node communication configuration further includes an increased subcarrier spacing.

23. The repeater wireless node of claim 19, wherein the source wireless node communication configuration further includes transmission of a configured signal to the repeater wireless node before transmitting the signal to the repeater wireless node.

24. The repeater wireless node of claim 19, wherein the source wireless node communication configuration further includes a configured timing reference associated with a repeater delay at the repeater wireless node.

25. A control node for wireless communication, comprising:
a memory; and
one or more processors, coupled to the memory, configured to:
determine that a transmission of a signal from a source wireless node to a target wireless node is to be forwarded by a repeater wireless node that is using a power detection procedure;
select a communication configuration for use with the repeater wireless node that is using the power detection procedure, the communication configuration including a first transmit power or transmit beam for a first one or more symbols of a transmission to the repeater wireless node and a second transmit power or transmit beam for a second one or more symbols of the transmission to the repeater wireless node, and the first transmit power or transmit beam being associated with a higher effective isotropic radiated power relative to the second transmit power or transmit beam; and
transmit an indication of the communication configuration for use with the repeater wireless node that is using the power detection procedure.

26. The control node of claim 25, wherein the communication configuration further includes a configured timing reference associated with a repeater delay at the repeater wireless node.

27. The control node of claim 26, wherein the one or more processors, when configured to determine that the transmission of the signal is from the source wireless node to the target wireless node, are configured to:
receive an indicator that the signal is for transmission to the repeater wireless node for forwarding to the target wireless.

28. The control node of claim 27, wherein the indicator is received from at least one of the source wireless node, the repeater wireless node, or the target wireless node.

29. The source wireless node of claim 26, wherein the one or more processors are further configured to:
receive an indicator that the repeater wireless node is using the power detection procedure; and
wherein the one or more processors, to select the communication configuration, are configured to:
select the communication configuration based at least in part on receiving the indicator that the repeater wireless node is using the power detection procedure.

30. The control node of claim 26, wherein the communication configuration includes an extended cyclic prefix for at least an initial symbol of a communication burst or a slot.

* * * * *